US010282284B2

(12) United States Patent
Hu

(10) Patent No.: US 10,282,284 B2
(45) Date of Patent: May 7, 2019

(54) TEST METHOD, SYSTEM, AND DEVICE, AND READABLE STORAGE MEDIUM

(71) Applicant: PING AN TECHNOLOGY (SHENZHEN) CO., LTD., Shenzhen (CN)

(72) Inventor: Shuai Hu, Shenzhen (CN)

(73) Assignee: PING AN TECHNOLOGY (SHENZHEN) CO., LTD., Shenzhen (CN)

(*) Notice: Subject to any disclaimer, the term of this patent is extended or adjusted under 35 U.S.C. 154(b) by 0 days.

(21) Appl. No.: 15/735,983

(22) PCT Filed: Jan. 15, 2017

(86) PCT No.: PCT/CN2017/071198
§ 371 (c)(1),
(2) Date: Dec. 13, 2017

(87) PCT Pub. No.: WO2017/121400
PCT Pub. Date: Jul. 20, 2017

(65) Prior Publication Data
US 2018/0173618 A1 Jun. 21, 2018

(30) Foreign Application Priority Data

Jan. 16, 2016 (CN) .......................... 2016 1 0029774

(51) Int. Cl.
*G06F 11/36* (2006.01)
*G06F 3/0484* (2013.01)

(52) U.S. Cl.
CPC .......... *G06F 11/3692* (2013.01); *G06F 11/36* (2013.01); *G06F 11/3664* (2013.01);
(Continued)

(58) Field of Classification Search
CPC ............ G06F 11/3664; G06F 11/3672; G06F 11/3684; G06F 11/3688
See application file for complete search history.

(56) References Cited

U.S. PATENT DOCUMENTS

2003/0163295 A1  8/2003  Jakatdar et al.
2007/0279701 A1* 12/2007  Hsu ........................... G06F 8/30
                                                    358/403
(Continued)

FOREIGN PATENT DOCUMENTS

CN      101013386 A    8/2007
CN      101042673 A    9/2007
(Continued)

*Primary Examiner* — Jigar R Patel
(74) *Attorney, Agent, or Firm* — Gokalp Bayramoglu

(57) ABSTRACT

Disclosed are a test method, system, and device, as well as a readable storage medium. The test system is used to: set parameters of a test grid used for grid testing to obtain corresponding setting parameters; simulate a virtual test grid corresponding to the setting parameters for the uppermost layer of an operating interface of a tested application; extract a preset number of coordinate data from within the virtual test grid by a preset coordinate extraction rule; acquire a configuration file of the tested application from terminal under test and determine respective area pixel data of various controls of the tested application from the acquired configuration file; test the controls based on the acquired coordinate data and area pixel data by a preset test rule, to obtain respective test data of the various controls; and generate a corresponding test report for the tested application based on the obtained test data.

15 Claims, 7 Drawing Sheets

(52) U.S. Cl.
CPC ...... *G06F 11/3672* (2013.01); *G06F 11/3684* (2013.01); *G06F 11/3688* (2013.01); *G06F 3/04842* (2013.01)

(56) References Cited

U.S. PATENT DOCUMENTS

| | | | |
|---|---|---|---|
| 2010/0214418 A1* | 8/2010 | Germain | G09G 3/006 348/189 |
| 2013/0249580 A1* | 9/2013 | Dobson | H02S 50/10 324/750.16 |
| 2015/0261659 A1 | 9/2015 | Bader et al. | |
| 2016/0110407 A1* | 4/2016 | Studer | G06F 17/303 707/694 |
| 2017/0075786 A1* | 3/2017 | Ekambaram | G06F 11/3608 |
| 2017/0366395 A1* | 12/2017 | Goldfarb | H04L 12/4633 |

FOREIGN PATENT DOCUMENTS

| | | |
|---|---|---|
| CN | 103164300 A | 6/2013 |
| CN | 104484093 A | 4/2015 |
| CN | 104794050 A | 7/2015 |
| CN | 105930261 A | 9/2016 |

* cited by examiner

TEST METHOD, SYSTEM, AND DEVICE, AND READABLE STORAGE MEDIUM

CROSS REFERENCE OF RELATED APPLICATIONS

The present application is the national phase entry of international application no. PCT/CN2017/071198, filed on Jan. 15, 2017, which claims the benefit of priority from Chinese Application No. 201610029774.6, filed on Jan. 16, 2016, the entire content of which is incorporated herein in its entirety.

TECHNICAL FIELD

This disclosure relates generally to the field of automated testing techniques, and more particularly relates to a test method, system, and device, as well as a readable storage medium.

BACKGROUND

With the continuing development of communications technology, a variety of intelligent mobile terminals are becoming more and more important in people's daily work, life and study. For example, almost everyone now is using a smartphone, and tablet computers are also in the growing popularity. Users can install a variety of different applications (apps) on the mobile terminal according to their needs, so as to enjoy different services.

But currently the operating systems of many smart mobile terminals such as mobile phones are relatively closed, very few application programming interfaces (APIs) are available for automated testing of user interfaces (UIs); in addition, the click efficiency is low, resulting in a low test accuracy as well as a low test efficiency for the applications installed on the mobile phone.

SUMMARY

In view of the above, it is necessary to provide a test method, system, and device, as well as a readable storage medium for automated execution of testing applications on the terminal under test, thus improving the test accuracy and test efficiency.

A test method includes the following steps. A test system first sets the parameters of a test grid used for grid testing, to obtain the corresponding setting parameters. A virtual test grid corresponding to the setting parameters is simulated and generated for the uppermost layer surface of an operating interface of a tested application. A preset number of coordinate data is then extracted from within the virtual test grid according to a preset coordinate extraction rule. Then a configuration file of the tested application is acquired from the terminal under test, and the respective area pixel data of various controls of the tested application is determined from the acquired configuration file. The various controls are then tested based on the acquired coordinate data and area pixel data according to a preset test rule, to obtain the respective test data of the various controls. Finally a corresponding test report of the tested application is generated based on the obtained test data.

A test system is provided that includes: a setting module configured for setting the parameters of a test grid used for grid testing, to obtain the corresponding setting parameters; a grid generation module configured for simulating and thus generating a virtual test grid corresponding to the setting parameters for the uppermost layer surface of an operating interface of a tested application; an extraction module configured for extracting a preset number of coordinate data from within the virtual test grid according to a preset coordinate extraction rule; an acquisition module configured for acquiring a configuration file of the tested application from the terminal under test, and determine the respective area pixel data of various controls of the tested application from the acquired configuration file; a test module configured for testing the various controls based on the acquired coordinate data and area pixel data according to a preset test rule, to obtain the respective test data of the various controls; and a report generation module configured for generating a corresponding test report of the tested application based on the obtained test data.

A test device may include a processing unit, as well as a test system, an input/output unit, a communication unit, and a storage unit that are coupled to the processing unit. The input/output unit is used for inputting a user instruction and outputting response data of the test device to the input user instruction. The communication unit is used for communicative connection with a predetermined terminal or background server. The storage unit is used for storing the test system as well as operating data of the test system. The processing unit is configured to invoke and execute the test system to perform the following steps: setting the parameters of a test grid used for grid testing, to obtain the corresponding setting parameters; simulating and generating a virtual test grid corresponding to the setting parameters for the uppermost layer surface of an operating interface of a tested application; extracting a preset number of coordinate data from within the virtual test grid according to a preset coordinate extraction rule; acquiring a configuration file of the tested application from the terminal under test, and determining the respective area pixel data of various controls of the tested application from the acquired configuration file; testing the various controls based on the acquired coordinate data and area pixel data according to a preset test rule, to obtain the respective test data of the various controls; and generating a corresponding test report of the tested application based on the obtained test data.

A computer readable storage medium is also provided that stores one or more programs, which, when executed by one or more processors, perform the following steps: setting the parameters of a test grid used for grid testing, to obtain the corresponding setting parameters; simulating and generating a virtual test grid corresponding to the setting parameters for the uppermost layer surface of an operating interface of a tested application; extracting a preset number of coordinate data from within the virtual test grid according to a preset coordinate extraction rule; acquiring a configuration file of the tested application from the terminal under test, and determining the respective area pixel data of various controls of the tested application from the acquired configuration file; testing the various controls based on the acquired coordinate data and area pixel data according to a preset test rule, to obtain the respective test data of the various controls; and generating a corresponding test report of the tested application based on the obtained test data.

The test method, system, and device together with the readable storage medium according to this disclosure can bring the following benefits.

The test system can be used to: set the parameters of the test grid used for grid testing to obtain the corresponding setting parameters; simulate and generate a virtual test grid corresponding to the setting parameters for the uppermost layer surface of the operating interface of the tested application; extract a preset number of coordinate data from within the virtual test grid according to the preset coordinate extraction rule; acquire the configuration file of the tested application from the terminal under test, and determine the respective area pixel data of various controls of the tested application from the acquired configuration file; test the various controls based on the acquired coordinate data and area pixel data according to the preset test rule, to obtain the respective test data of the various controls; and generate a corresponding test report of the tested application based on the obtained test data. As can be seen from above, the test system have advantages of automated execution of testing applications on the terminal under test—hence improved test accuracy and test efficiency—avoiding the low test efficiency due to very few APIs on the terminal under test that are available for automated testing, thus making the test mode not affected by the number of corresponding APIs.

Objects, functional features, and advantages of this disclosure will be described below in further detail in connection with embodiments and the accompanying drawings.

DETAILED DESCRIPTION OF THE INVENTION

Hereinafter technical solutions of this disclosure will described in further detail in connection with specific embodiments and the accompanying drawings. It will be appreciated that the specific embodiments described herein are merely illustrative of the disclosure and are not intended to limit the disclosure.

In the following embodiments of the test method and test system according to the disclosure, the test system described may include any terminal used for testing, including without limitation: smart terminals such as personal computers; smart mobile terminals such as notebook computers, smartphones, tablet computers, etc.—but the specific forms and types of the test system will not be limited in the embodiments of the disclosure.

Figure 1:
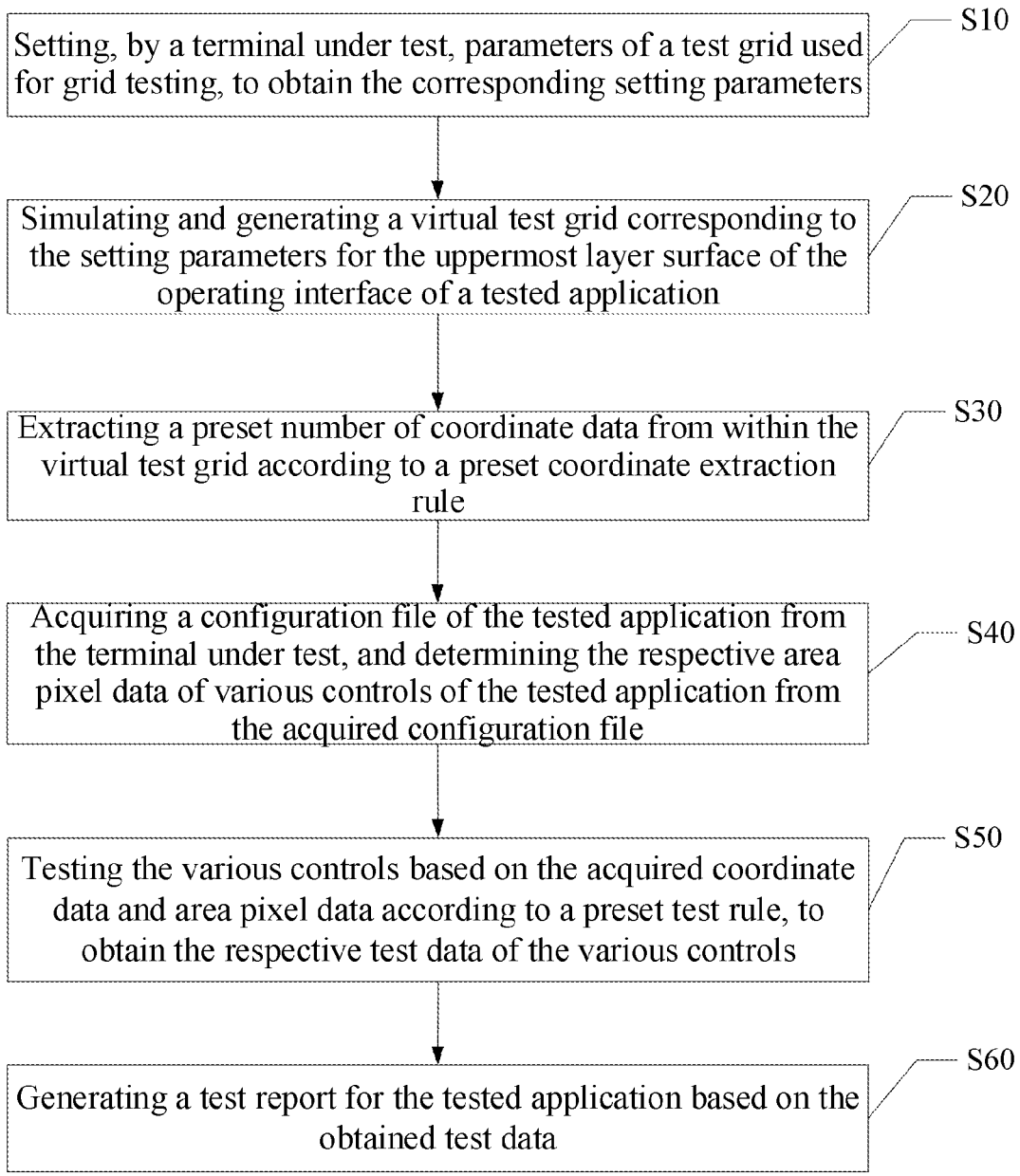
FIG. 1 is a flowchart illustrating an embodiment of a test method according to the disclosure.

This disclosure provides a test method for automating testing of applications on the terminal under test to improve the test accuracy and test efficiency. As illustrated in FIG. 1, the test method according to this disclosure can be implemented as the following steps S10-S60.

At S10, a test system sets the parameters of a test grid used for grid testing, to obtain the corresponding setting parameters.

In this embodiment, the test system may first set the parameters of the test grid, where the test grid is used for grid testing. The parameters set by the test system for the above test grid may include without limitation: dimension parameters of the test grid, e.g., width and height of the test grid, number of rows and of columns of the test grid, etc.

The test system can set the specific corresponding parameters of the test grid according to particular test requirements. In this embodiment, however, the specific types and values of the setting parameters obtained by the test system will not be limited.

At S20, a virtual test grid corresponding to the setting parameters is simulated and generated for the uppermost layer surface of an operating interface of a tested application.

For the uppermost layer surface of the operating interface of the tested application, the test system may simulate and generate a virtual test grid corresponding to the above setting parameters. The above simulated and generated virtual test grid may consist of a plurality of grid blocks formed by intersection of a number of horizontally uniformly distributed virtual straight lines and a number of vertically uniformly distributed virtual straight lines, where the number of the horizontal virtual straight lines is consistent with the number of rows of the virtual test grid, while the number of the vertically virtual straight lines is consistent with the number of columns of the virtual test grid.

At S30, a preset number of coordinate data is extracted from within the virtual test grid according to a preset coordinate extraction rule.

According to the preset coordinate extraction rule, the test system may extract the preset number of coordinate data from within the above simulated and generated virtual test grid. For example, the test system may extract coordinate data from different positions, respectively, on the above virtual test grid, based on the specific type of the tested application. For example, the corresponding number of coordinate data may be extracted from each of the five positions—i.e., the upper, lower, left, right, and central part—on the virtual test grid, for subsequent testing.

In S40, a configuration file of the tested application is acquired from the terminal under test, and the respective area pixel data of various controls of the tested application is determined from the acquired configuration file.

The test system may acquire the corresponding configuration file of the above tested application from the test system under test, where the terminal under test may include without limitation smart mobile terminals such as mobile phones and the like. Based on the extracted configuration file, the test system can determine the respective area pixel data of the various controls of the tested application. The various controls may be all the controls included in the operating interface of the tested application. For instance, one of the controls may have a rectangular display area on the operating interface of the tested application, with the area pixel data of the rectangular area having abscissas ranging from pixel A to pixel B, and ordinates ranging from pixel C to pixel D.

At S50, the various controls are tested based on the acquired coordinate data and area pixel data according to a preset test rule, to obtain the respective test data of the various controls.

The test system may test the various controls of the tested application according to the preset test rule, based on the extracted coordinate data and the acquired respective area pixel data of the various controls of the tested application. For example, the various controls can be sorted by their importance levels according to the frequency of use of each control in the tested application during a preset duration of time, and further the various controls can be tested in an order according to the sorting results. Or, the various controls can be sorted by their position order on the operating interface of the tested application—from top to bottom and left to right—and so the various controls can be tested in an order according to the sorting results.

Thus, based on the respective test results of the various controls of the above tested application, the tested application can acquire the respective test data of the above various controls.

In this embodiment, the preset test rule by which the test system tests the various controls of the tested application can be particularly configured based on the specific type and application scenario of the tested application as well as all the controls included on the operating interface of the tested application. In this embodiment, however, the specific rule details of the above preset test rule will not be limited.

At S60, a corresponding test report of the tested application is generated based on the obtained test data.

Having acquired the respective test data of the various controls on the operating interface of the tested application, the tested application can generate a corresponding test report for the user to view.

For example, the test system may categorize the corresponding test data of all the controls by types of the controls, and so generate the corresponding test report based on the categories. Or, the test system may categorize the corresponding test data of all the controls by whether the test results are abnormal, so that a corresponding test report for normal test results will be generated for the controls with normal test results, while a corresponding report for abnormal test results will be generated for the controls with abnormal test results. Or, the test system may generate a corresponding test report for only the corresponding test data of the controls with abnormal test results.

By the test method according to this disclosure, the test system can be used to: set the parameters of the test grid used for grid testing to obtain the corresponding setting parameters; simulate and generate a virtual test grid corresponding to the setting parameters for the uppermost layer surface of the operating interface of the tested application; extract a preset number of coordinate data from within the virtual test grid according to the preset coordinate extraction rule; acquire the configuration file of the tested application from the terminal under test and determine the respective area pixel data of various controls of the tested application from the acquired configuration file; test the various controls based on the acquired coordinate data and area pixel data according to the preset test rule, to obtain the respective test data of the various controls; and generate a corresponding test report of the tested application based on the obtained test data. As can be seen from above, the test system have advantages of automated execution of testing applications on the terminal under test hence improved test accuracy and test efficiency, avoiding the low test efficiency due to very few APIs on the terminal under test that are available for automated testing, thus making the test mode not affected by the number of corresponding APIs.

Figure 2:
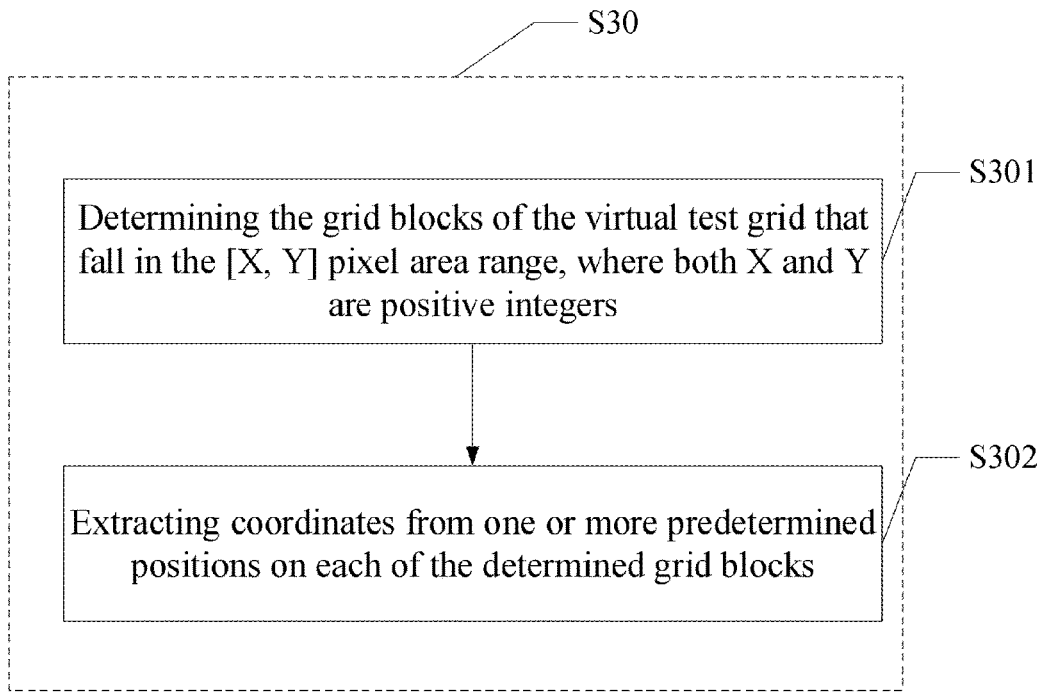
FIG. 2 is a flowchart illustrating an implementation of step S30 shown in the embodiment of FIG. 1 of the test method according to the disclosure.

In the test method of this disclosure, the test system can extract a preset number of coordinate data from the simulated and generated virtual test grid according to the implementation illustrated in FIG. 2, on the basis of the description of the embodiment shown in FIG. 1.

As illustrated in FIG. 2, step S30 "extracting a preset number of coordinate data from within the virtual test grid according to a preset coordinate extraction rule" shown in the embodiment of FIG. 1 of the test method according to the disclosure may be implemented as the following steps S301-S302.

At S301, the grid blocks of the virtual test grid that fall in the [X, Y] pixel area range are determined, where both X and Y are positive integers.

At S302, coordinates are extracted from one or more preset positions of each of the determined grid blocks to obtain a preset number of coordinate data.

In this embodiment, the test system may first determine from which pixel area range on the virtual test grid the coordinate data is to be extracted, and then further extract the preset number of coordinate data based on the determined pixel area range.

For example, the test system may determine the grid blocks of the virtual test grid that falls in the [X, Y] pixel area range, and then further extract the preset number of coordinate data from the grid blocks whose pixel area ranges fall in the above [X, Y] area. In extracting the coordinate data, at least one preset position of each of the above determined various grid blocks may be extracted from. For example, the corresponding coordinate data may be extracted from the center, and/or the upper left corner, and/or upper right corner, and/or lower left corner, and/or lower right corner, of each of the grid blocks. In this embodiment, both X and Y are positive integers.

In an exemplary embodiment, the test system can also extract the corresponding coordinate data by the following means.

That is, the test system can directly extract coordinates from one or more preset positions on each of the various grid blocks in the virtual test grid, so as to extract altogether the preset number of coordinate data, where the preset number may be an integral multiple of the number of grid blocks in the virtual test grid.

In this embodiment, the preset number (i.e., the specific number) of coordinate data to be extracted can be determined based on the number of controls of the tested application, as well as other factors including the type, the importance level, the frequency of use, etc., of the tested application; in this embodiment, however, the specific value of the preset number will not be limited.

By the test method of this disclosure, the preset number of coordinate data can be extracted from within the virtual test grid according to different preset coordinate extraction rules, thus further improving the test accuracy.

Figure 3:
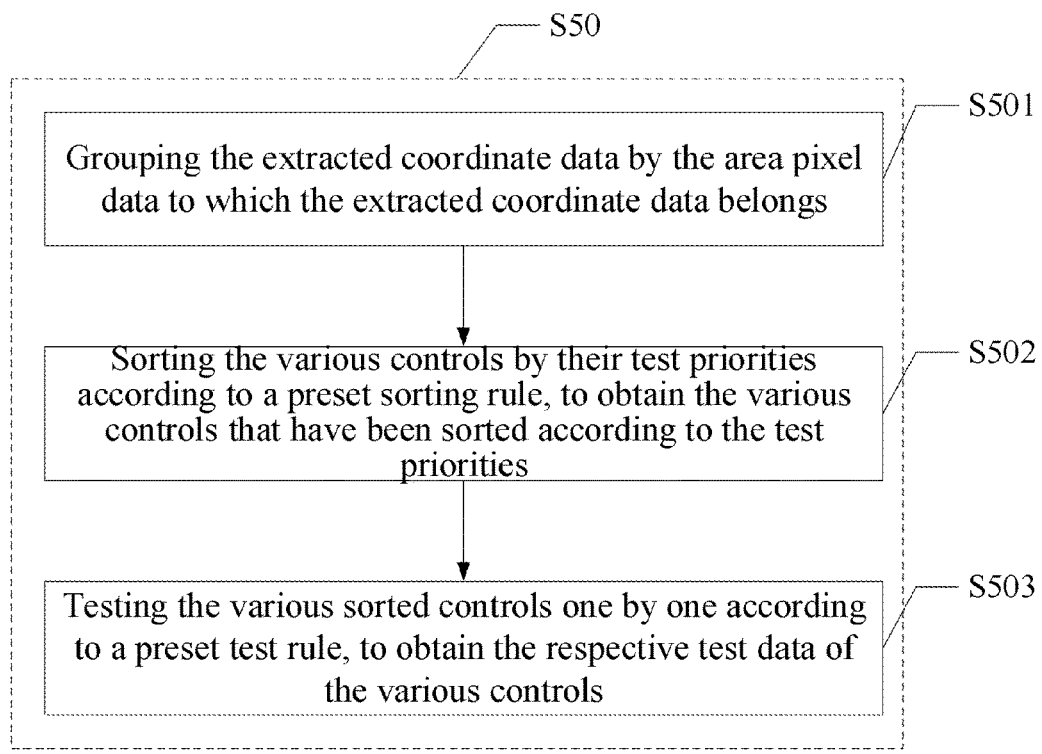
FIG. 3 is a flowchart illustrating an implementation of step S50 shown in the embodiment of FIG. 1 of the test method according to the disclosure.

In the test method of this disclosure, the test system's testing the various controls on the operating interface of the tested application can be implemented by the way illustrated in FIG. 3, on the basis of the description of the embodiments of FIGS. 1 and 2.

As illustrated in FIG. 3, step S50 "testing the various controls based on the acquired coordinate data and area pixel data according to a preset test rule, to obtain the respective test data of the various controls" as shown in the embodiment of FIG. 1 of the test method of the disclosure can be implemented by the following steps S501-S503.

At S501, the extracted coordinate data is grouped by the area pixel data to which it belongs.

In this embodiment, the test system may first group the above extracted coordinate data by the area pixel data to which the extracted coordinate data belongs. For example, the coordinate data that belongs to the same area pixel data may be divided to the same group, while the coordinate data that belongs to different area pixel data will be divided into different groups.

At S502, test priorities are sorted for the various controls according to a preset sorting rule, to obtain the various controls that have been ordered according to the test priorities.

After the above coordinate data is grouped, the various controls may be sorted by their test priorities based on the grouped coordinate data as well as the preset sorting rule.

For example, the corresponding control of the area pixel data with a comparatively smaller abscissa lower limit value may be ordered before that with a greater abscissa lower limit value, and the corresponding control of the area pixel data with a comparatively smaller ordinate lower limit value may be ordered before that with a greater ordinate lower limit value. For multiple pieces of area pixel data having identical abscissa lower limit value, then the ordinate lower limit values of these area pixel data would be compared, and so the corresponding control of the area pixel data with a comparatively smaller ordinate lower limit value would be ordered preceding that with a greater ordinate lower limit value. Likewise, for multiple pieces of area pixel data having identical ordinate lower limit value, then the abscissa lower limit values of these area pixel data would be compared, and so the corresponding control of the area pixel data with a comparatively smaller abscissa lower limit value would be ordered preceding that with a greater abscissa lower limit value.

At S503, the various sorted controls are tested one by one according to a preset test rule, to obtain the respective test data of the various controls.

For the various sorted controls, the test system may test them one by one according to the preset test rule. For example, in testing the click operations on each control, a test prompt message "Please click control A" may be sent to the terminal under test for the various sorted controls one by one, and the corresponding test data of each of the controls may be acquired from the terminal under test. Upon completion of the testing of one control, the control immediately following this control according to the order will then be tested.

In an exemplary embodiment of the disclosure, the test system may send the corresponding test prompt messages for the various controls to the terminal in an one-by-one manner according to the test priority order, and then identify whether it has acquired the test data of the corresponding control from the terminal under test. If identifying that the test data of the corresponding control has been acquired from the terminal under test, then the test system may continue to send the test prompt message for the control ordered after the corresponding control according to the test priority order; otherwise if identifying that no test data of the corresponding control has been acquired from the terminal under test, then the test system may continue to acquire the test data of the corresponding control from the terminal under test.

For example, in the specific test environment for click operations on the various controls, the test system may send corresponding test prompt messages for the various controls to the terminal under test in an one-by-one manner according to the test priority order. For example, one test prompt message can be "Please click control A". The operator then may perform a click operation on control A in accordance with the above prompt message. If having acquired the test data of control A, then the test system may continue to send a test prompt message similar as above for the control ordered immediately after control A according to the above test priority order; otherwise if no test data of control A has been acquired, then the test system may continue to acquire the corresponding test data of control A from the terminal under test.

The test method of this disclosure can test the various controls based on the acquired coordinate data and area pixel data according to the preset test rule, to obtain the respective test data of the various controls, and so has the benefit of performing test according to the priority levels of the controls, improving the test intelligence.

Figure 4:
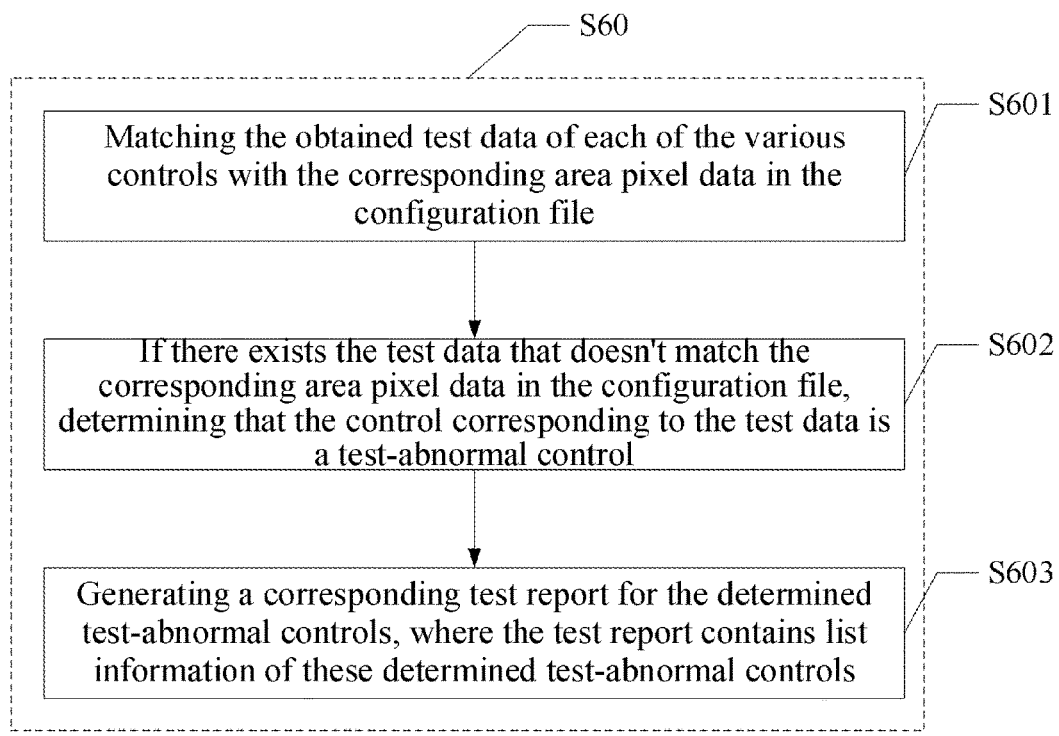
FIG. 4 is a flowchart illustrating an implementation of step S60 shown in the embodiment of FIG. 1 of the test method according to the disclosure.

In the test method of this disclosure, the test system can generate the corresponding test report of the tested application according to the implementation illustrated in FIG. 4, on the basis of the description of the embodiments illustrated in FIGS. 1 through 3.

As illustrated in FIG. 4, step S60 "generating a corresponding test report of the tested application based on the obtained test data" as shown in the embodiment of FIG. 1 of the test method of the disclosure can be implemented by the following steps S601-S603.

At S601, the acquired corresponding test data of each of the various controls is matched with the corresponding area pixel data in the configuration file.

At S602, if there exists the test data that doesn't match the corresponding area pixel data in the configuration file, then the control corresponding to the test data is determined as a test-abnormal control.

At S603, a corresponding test report is generated for the determined test-abnormal controls, where the test report contains list information of these test-abnormal controls.

In this embodiment, the test system can match the corresponding test data of each of the various controls acquired from the terminal under test with the corresponding area pixel data of this control in the configuration file of the tested application, e.g., the test system may determine whether the coordinate data in the above test data belongs to the corresponding area pixel data. If there exists the test data that doesn't match the corresponding area pixel data in the configuration file, then the test system may determine that the control corresponding to the test data is a test-abnormal control, and thus further generate a corresponding test report for the determined test-abnormal controls. The test report may contain the list information of those determined test-abnormal controls.

In an exemplary embodiment of the disclosure, the test report generated by the test system can be named by the corresponding specific test operation on the various controls on the operating interface of the tested application. For embodiment, for a click operation on the various controls on the operating interface of the tested application, the generated test report can be a "Control Click Test Report".

The test method of this disclosure can generate the corresponding test report for the tested application based on the obtained test data, and so has the benefit of generating the corresponding test report based on specific test data, improving the flexibility in generating the test report.

This disclosure further provides a test system corresponding to the test method described in the foregoing embodiments. The test system is suitable for being used as the test system described in any of the embodiments illustrated in FIGS. 1 through 4.

Figure 5:
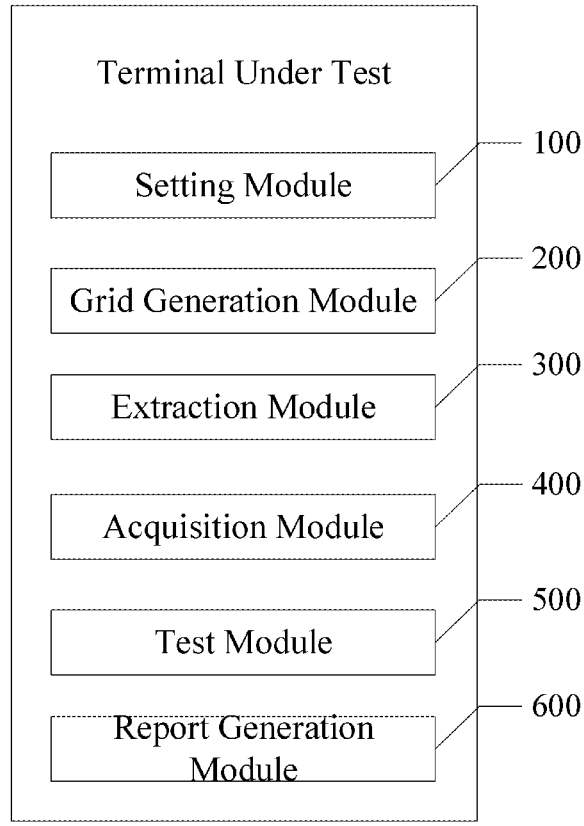
FIG. 5 is a block diagram illustrating an embodiment of a test system according to the disclosure.

As illustrated in FIG. 5, the test system according to this disclosure may include a setting module 100, a grid generation module 200, an extraction module 300, an acquisition module 400, a test module 500, and a report generation module 600.

The setting module 100 is configured for setting the parameters of a test grid used for grid testing, to obtain the corresponding setting parameters.

The grid generation module 200 is configured for simulating and thus generating a virtual test grid corresponding to the setting parameters for the uppermost layer surface of an operating interface of a tested application.

The extraction module 300 is configured for extracting a preset number of coordinate data from within the virtual test grid according to a preset coordinate extraction rule.

The acquisition module 400 is configured for acquiring a configuration file of the tested application from the terminal under test, and determining the respective area pixel data of various controls of the tested application from the acquired configuration file.

The test module 500 is configured for testing the various controls based on the acquired coordinate data and area pixel data according to a preset test rule, to obtain the respective test data of the various controls.

The report generation module 600 is configured for generating a corresponding test report of the tested application based on the obtained test data.

Figure 6:
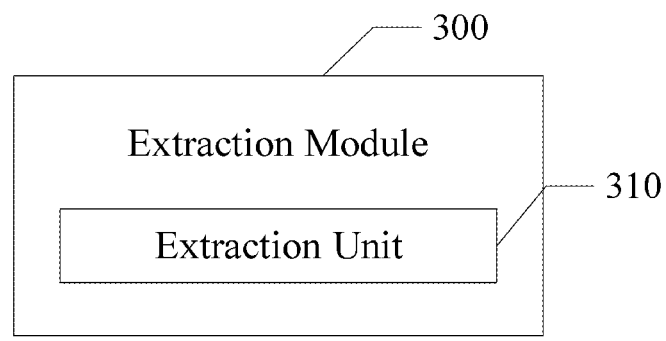
FIG. 6 is a block diagram illustrating an implementation of extraction module 300 shown in the embodiment of FIG. 5 of the test system according to the disclosure.

In an exemplary embodiment of the disclosure, as illustrated in FIG. 6, extraction module 300 in the test system of the disclosure may include:

an extraction unit 310 configured to extract coordinates from one or more preset positions of each of various grid blocks in the virtual test grid, so as to extract altogether the preset number of coordinate data, where the preset number may be an integral multiple of the number of grid blocks in the virtual test grid.

Figure 7:
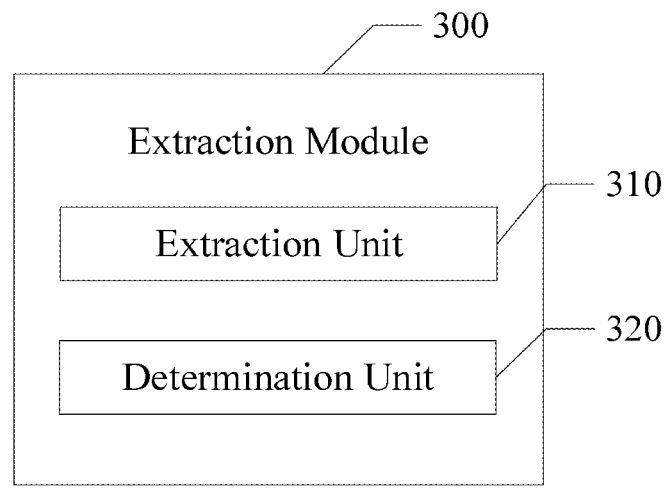
FIG. 7 is a block diagram illustrating another implementation of extraction module 300 shown in the embodiment of FIG. 5 of the test system according to the disclosure.

In an exemplary embodiment of the disclosure, as illustrated in FIG. 7, extraction module 300 in the test system of the disclosure may further include:

a determination unit 320 configured for determining the grid blocks of the virtual test grid that fall in the [X, Y] pixel area range, where both X and Y are positive integers.

In this embodiment, extraction unit 310 may further be configured to extract coordinates from one or more preset positions on each of the determined various grid blocks, so as to extract altogether the preset number of coordinate data.

Figure 8:
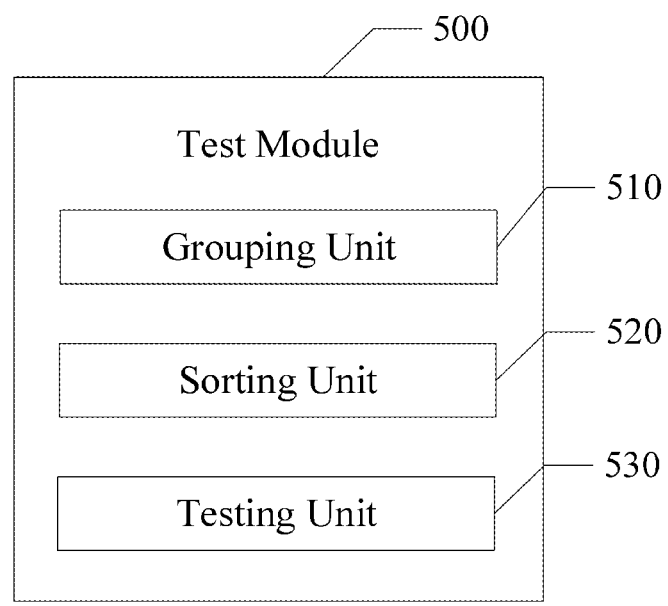
FIG. 8 is a block diagram illustrating an implementation of test module 500 shown in the embodiment of FIG. 5 of the test system according to the disclosure.

In an exemplary embodiment of the disclosure, as illustrated in FIG. 8, test module 500 in the test system of the disclosure may include:

a grouping unit 510 configured for grouping the extracted coordinate data by the area pixel data to which it belongs;

a sorting unit 520 configured for sorting test priorities of the respective controls according to a preset sorting rule, to obtain the various controls that have been ordered according to the test priorities; and a testing unit 530 configured for testing the various sorted controls one by one according to a preset test rule, to obtain the respective test data of the various controls.

In an exemplary embodiment of the disclosure, testing unit 530 may further be configured for:

sending a corresponding test prompt message for each of the various controls to the terminal under test in an one-by-one manner according to the test priority order, and identifying whether it has acquired the test data of the corresponding control from the terminal under test;

if identifying that the test data of the corresponding control has been acquired from the terminal under test, continuing to send the test prompt message for the control ordered after the corresponding control according to the test priority order; and otherwise if identifying that no test data of the corresponding control has been acquired from the terminal under test, then continuing to acquire the test data of the corresponding control from the terminal under test.

Figure 9:
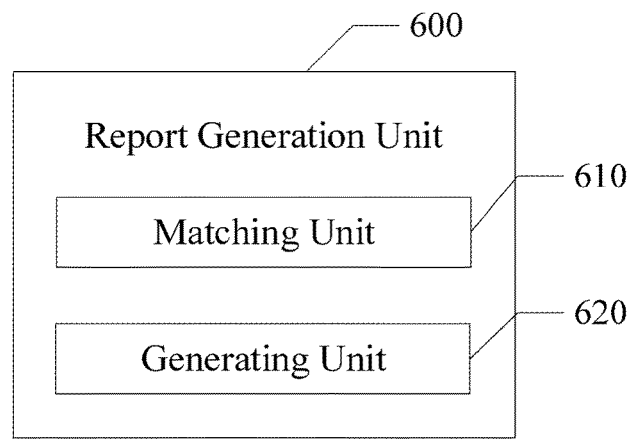
FIG. 9 is a block diagram illustrating an implementation of generation module 600 shown in the embodiment of FIG. 5 of the test system according to the disclosure.

In an exemplary embodiment of the disclosure, as illustrated in FIG. 9, report generation module 600 in the test system of the disclosure may include:

a matching unit 610 configured for matching the acquired corresponding test data of each of the various controls with the corresponding area pixel data in the configuration file; and a generating unit 620 configured for:

if there exists the test data that doesn't match the corresponding area pixel data in the configuration file, determining that the control corresponding to the test data is a test-abnormal control; and generating a corresponding test report for the determined test-abnormal controls, the test report containing list information of these test-abnormal controls.

The test system of this disclosure can be used to: set the parameters of the test grid used for grid testing to obtain the corresponding setting parameters; simulate and generate a virtual test grid corresponding to the setting parameters for the uppermost layer surface of the operating interface of the tested application; extract a preset number of coordinate data from within the virtual test grid according to the preset coordinate extraction rule; acquire the configuration file of the tested application from the terminal under test and determine the respective area pixel data of various controls of the tested application from the acquired configuration file; test the various controls based on the acquired coordinate data and area pixel data according to the preset test rule, to obtain the respective test data of the various controls; and generate a corresponding test report of the tested application based on the obtained test data. As can be seen from above, the test system can have advantages of automated execution of testing applications on the terminal under test hence improved test accuracy and test efficiency, avoiding the low test efficiency due to the very few APIs on the terminal under test that are available for automated testing, thus making the test mode not affected by the number of corresponding APIs.

In hardware implementation, the above setting module 100, grid generation module 200, extraction module 300, acquisition module 400, test module 500, and report generation module 600 may be embedded in or separate from the test device in the form of hardware, or can also be stored in the memory of the test device in the form of software so that the processor can invoke and execute the corresponding operations of the various modules mentioned above. The processor may be a central processing unit (CPU), a microprocessor, a single chip microcomputer (SCM), etc.

Figure 10:
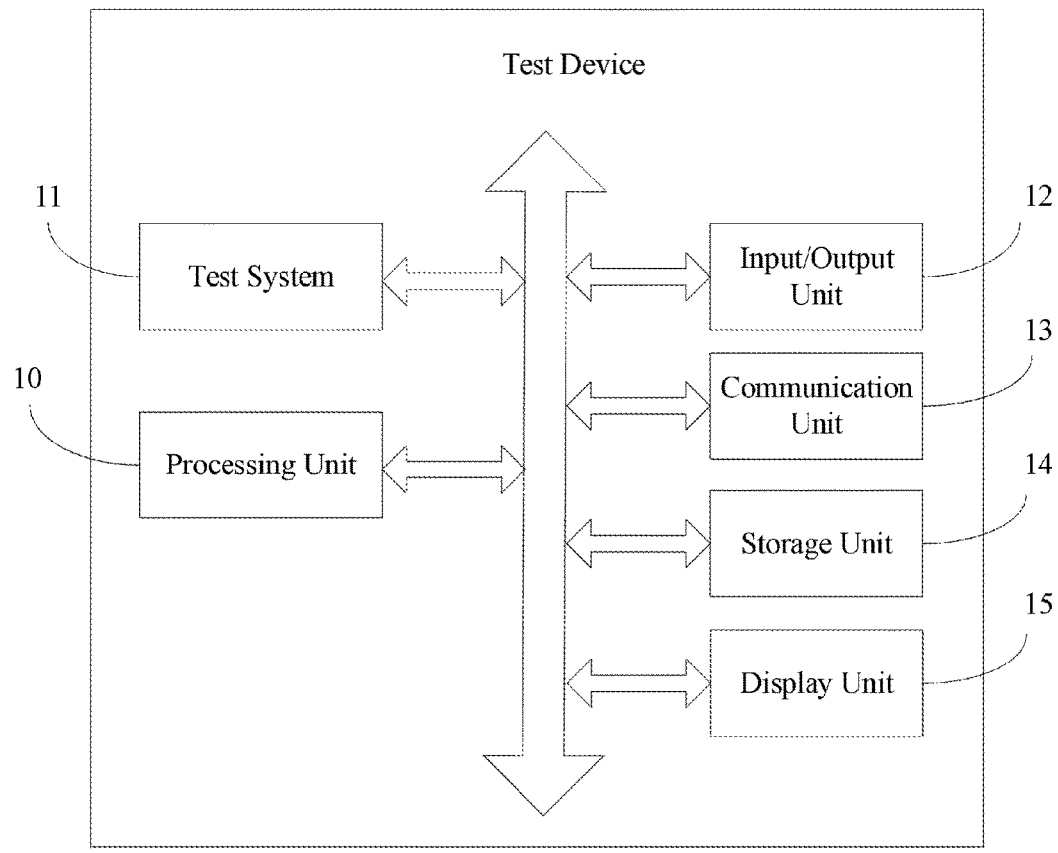
FIG. 10 is a hardware configuration diagram illustrating a first embodiment of a test device according to the disclosure.

As illustrated in FIG. 10, a hardware configuration diagram of a first embodiment of a test device according to the disclosure is shown. In this embodiment, the test device may include a processing unit 10, as well as a test system 11, an input/output unit 12, a communication unit 13, a storage unit 14, and a display unit 15 that are coupled to processing unit 10.

The input/output unit 12 may be one or more physical buttons and/or mice and/or joysticks, which is used for inputting a user instruction and outputting response data of the test device to the input user instruction.

Communication unit 13 may be communicatively connected to one or more predetermined terminals (e.g., a mobile phone, a tablet, etc.) or background servers. Communication unit 13 may include a WiFi module (thereby operative to communicate with the background server over the mobile Internet using the WiFi module), a Bluetooth module (thereby operative to perform short range communications with a mobile phone by the Bluetooth module, and/or a GPRS module (thereby operative to communicate with the background server over the mobile Internet).

Storage unit 14 may include a storage space or a collection of a plurality of storage spaces for storing test system 11 and test data of test system 11.

Display unit 15 is used for displaying a human-computer interaction interface for the user to input an instruction and for outputting and displaying the response data of the test device to the user instruction.

Processing unit 10 is configured to invoke and execute test system 11 to perform the following operations:

setting the parameters of a test grid used for grid testing, to obtain the corresponding setting parameters;

simulating and generating a virtual test grid corresponding to the setting parameters for the uppermost layer surface of an operating interface of a tested application;

extracting a preset number of coordinate data from within the virtual test grid according to a preset coordinate extraction rule;

acquiring a configuration file of the tested application from the terminal under test, and determining the respective area pixel data of various controls of the tested application from the acquired configuration file;

testing the various controls based on the acquired coordinate data and area pixel data according to a preset test rule, to obtain the respective test data of the various controls; and generating a corresponding test report of the tested application based on the obtained test data.

Test system 11 may be composed of a series of program code or code instructions, which can be invoked and executed by processing unit 10 to perform functions corresponding to the included program code or code instructions.

Typically, processing unit 10 may invoke and execute test system 11 to extract a preset number of coordinate data from within the virtual test grid according to a preset coordinate extraction rule, including:

extracting coordinates from one or more preset positions on each of various grid blocks in the virtual test grid, so as to obtain the preset number of coordinate data, where the preset number may be an integral multiple of the number of grid blocks in the virtual test grid;

or determining the grid blocks of the virtual test grid that fall in the [X, Y] pixel area range, where both X and Y are positive integers; and then extracting coordinates from one or more preset positions on each of the determined grid blocks to obtain the preset number of coordinate data.

Typically, processing unit 10 may invoke and execute test system 11, where testing the various controls based on the acquired coordinate data and area pixel data according to the preset test rule to obtain the respective data of the various controls may include:

grouping the extracted coordinate data by the area pixel data to which the extracted coordinate data belongs;

sorting test priorities of the respective controls according to a preset sorting rule, to obtain the various controls that have been ordered according to the test priorities; and testing the various sorted controls one by one according to a preset test rule, to obtain the respective test data of the various controls.

Typically, processing unit 10 may invoke and execute test system 11, where testing the various sorted controls one by one according to the preset test rule to obtain the respective data of the various controls may include:

sending corresponding test prompt messages for the various controls to the terminal under test in an one-by-one manner according to the test priority order, and identifying whether the test data of the corresponding control has been acquired from the terminal under test;

if identifying that the test data of the corresponding control has been acquired from the terminal under test, continuing to send the test prompt message for the control ordered after the corresponding control according to the test priority order; and otherwise if identifying that no test data of the corresponding control has been acquired from the terminal under test, then continuing to acquire the test data of the corresponding control from the terminal under test.

Typically, processing unit 10 may invoke and execute test system 11, where generating the corresponding test report for the tested application based on the obtained test data may include:

matching the acquired corresponding test data of each of the various controls with the corresponding area pixel data in the configuration file;

if there exists the test data that doesn't match the corresponding area pixel data in the configuration file, determining that the control corresponding to the test data is a test-abnormal control; and generating a corresponding test report for the determined test-abnormal controls, where the test report contains list information of these test-abnormal controls.

Figure 11:
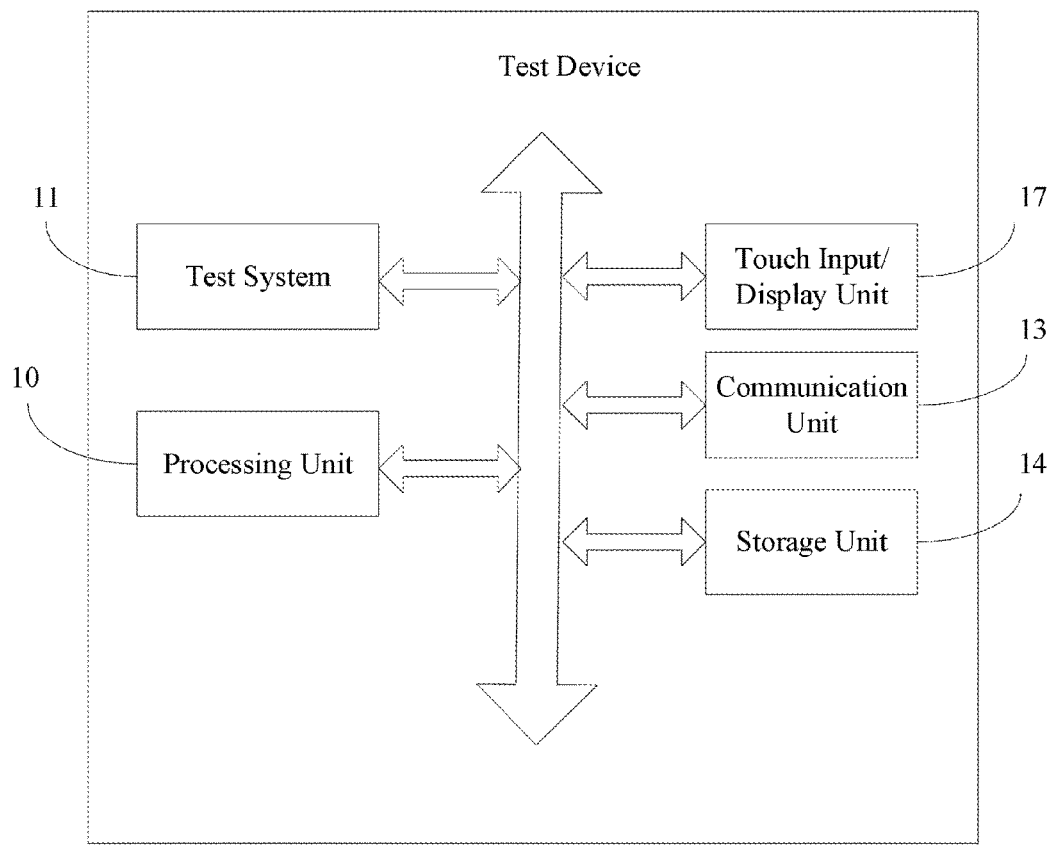
FIG. 11 is a hardware configuration diagram illustrating a second embodiment of a test device according to the disclosure.

As illustrated in FIG. 11, a hardware configuration diagram of a second embodiment of a test device according to the disclosure is shown. The test device of this embodiment is substantially similar to that of the first embodiment, the major difference of which lies in that in this embodiment the input/output unit 12 and display unit 15 are replaced with a touch input/display unit 17.

Touch input/display unit 17 is used for providing a human-computer interaction interface for the user to input an instruction by the human-computer interaction interface and for outputting and displaying the response data of the test device to the user instruction. In this embodiment, touch input/display unit 17 may include a touch input unit and a display unit. The touch input unit is used for touch input in the touch sensing area of the human-computer interaction interface, while the display unit may be one embedded with a touch panel. The human-computer interaction interface may include one or more virtual keys (not shown), which have the same functionalities as the physical buttons described in the first embodiment of the disclosure, and so are not to be detailed herein. In addition, it will be appreciated that any physical button and/or mouse and/or joystick mentioned in the first embodiment can all be replaced with virtual keys on the touch input/display unit 17.

This disclosure further provides a computer readable storage medium that stores one or more programs, which, when executed by one or more processors, perform the following operations:

setting the parameters of a test grid used for grid testing, to obtain the corresponding setting parameters;

simulating and generating a virtual test grid corresponding to the setting parameters for the uppermost layer surface of an operating interface of a tested application;

extracting a preset number of coordinate data from within the virtual test grid according to a preset coordinate extraction rule;

acquiring a configuration file of the tested application from the terminal under test, and determining the respective area pixel data of various controls of the tested application from the acquired configuration file;

testing the various controls based on the acquired coordinate data and area pixel data according to a preset test rule, to obtain the respective test data of the various controls; and generating a corresponding test report of the tested application based on the obtained test data.

Typically, extracting the preset number of coordinate data from within the virtual test grid according to the preset coordinate extraction rule may include:

extracting coordinates from one or more preset positions of each of various grid blocks in the virtual test grid, so as to obtain the preset number of coordinate data, where the preset number may be an integral multiple of the number of grid blocks in the virtual test grid;

or determining the grid blocks of the virtual test grid that fall in the [X, Y] pixel area range, where both X and Y are positive integers; and then extracting coordinates from one or more preset positions on each of the determined grid blocks to obtain the preset number of coordinate data.

Typically, testing the various controls based on the acquired coordinate data and area pixel data according to the preset test rule to obtain the respective test data of the various controls may include:

grouping the extracted coordinate data by the area pixel data to which the extracted coordinate data belongs;

sorting test priorities of the respective controls according to a preset sorting rule, to obtain the various controls that have been ordered according to the test priorities; and testing the various sorted controls one by one according to a preset test rule, to obtain the respective test data of the various controls.

Typically, testing the various sorted controls one by one according to the preset test rule to obtain the respective test data of the various controls may include:

sending corresponding test prompt messages for the various controls to the terminal under test in an one-by-one manner according to the test priority order, and identifying whether the test data of the corresponding control has been acquired from the terminal under test;

if identifying that the test data of the corresponding control has been acquired from the terminal under test, continuing to send the test prompt message for the control ordered after the corresponding control according to the test priority order; and otherwise if identifying that no test data of the corresponding control has been acquired from the terminal under test, then continuing to acquire the test data of the corresponding control from the terminal under test.

Typically, generating the corresponding test report of the tested application based on the obtained test data may include:

matching the acquired corresponding test data of each of the various controls with the corresponding area pixel data in the configuration file;

if there exists the test data that doesn't match the corresponding area pixel data in the configuration file, determining that the control corresponding to the test data is a test-abnormal control; and generating a corresponding test report for the determined test-abnormal controls, where the test report contains list information of these test-abnormal controls.

Those of ordinary skill in the art will appreciate that some or all steps of the foregoing embodiments can be implemented by hardware, or can also be implemented by instructing the relevant hardware using programs. Programs can be stored in a computer readable storage medium, which can be a read-only memory, a magnetic disk, an optical disk, etc.

As used herein, the terms "including," "comprising," or any other non-exclusive terms are meant to state that processes, methods, articles, or systems including a series of elements will not only include those elements, other elements that haven't been explicitly listed or those elements inherent in such processes, methods, articles, or systems may also be included. In the absence of more restrictions, the element defined by the phrase "including/comprising a . . . " will not preclude the existence of additional such elements in the processes, methods, articles, or systems that include the element.

The above numbering of embodiments is for illustrative purposes only, and is not indicative of the pros and cons of these embodiments.

By the above description of embodiments, it will be evident to those of skill art that the methods according to the above embodiments can be implemented by means of software plus the necessary general-purpose hardware platform; they can of course be implemented by hardware, but in many cases the former will be advantageous. Based on such an understanding, the essential technical solution of the disclosure, or the portion that contributes to the prior art may be embodied as software products. Computer software products can be stored in a storage medium (e.g., a ROM/RAM, a magnetic disk, an optical disk) and may include multiple instructions that, when executed, can cause a computing device (e.g., a mobile phone, a computer, a server, a network device, etc.), to execute the methods as described in the various embodiments of the disclosure.

The foregoing description merely illustrates some exemplary embodiments of the disclosure and therefore is not intended as limiting the scope of the disclosure. Any equivalent configurational or flow transformations that are made taking advantage of the disclosure and that are used directly or indirectly in other related technical fields shall all fall in the scope of patent protection of the disclosure.

What is claimed is:

1. A test method comprising:

setting, by a test system, parameters of a test grid used for grid testing, to obtain corresponding setting parameters;

simulating and generating a virtual test grid corresponding to the setting parameters for an uppermost layer surface of an operating interface of a tested application;

extracting a preset number of coordinate data from within the virtual test grid according to a preset coordinate extraction rule;

acquiring a configuration file of the tested application from a terminal under test, and determining respective area pixel data of various controls of the tested application from the configuration file;

testing the various controls based on the coordinate data and area pixel data according to a preset test rule, to obtain respective test data of the various controls, wherein the testing the various controls comprises: grouping the extracted coordinate data by the area pixel data to which the extracted coordinate data belongs; sorting test priorities of the various controls according to a preset sorting rule, to obtain the various controls that have been ordered according to the test priorities; and testing the various sorted controls one by one according to a preset test rule, to obtain the test data of the various controls, wherein the testing the various sorted controls comprises: sending corresponding test prompt messages for the various controls to the terminal under test in a one-by-one manner by the test priority order, and identifying whether test data of corresponding control has been received from the terminal under test if identifying that the test data of the corresponding control has been acquired from the terminal under test, continuing to send the test prompt message for the control ordered after the corresponding control according to the test priority order; and otherwise if identifying that no test data of the corresponding control has been acquired from the terminal under test, continuing to acquire the test data of the corresponding control from the terminal under test; and generating a corresponding test report for the tested application based on the test data.

2. The test method of claim 1, wherein the extracting the preset number of coordinate data from within the virtual test grid according to the preset coordinate extraction rule comprises:

extracting coordinates from one or more preset positions on each of various grid blocks in the virtual test grid, so as to obtain the preset number of coordinate data, where the preset number is an integral multiple of the number of grid blocks in the virtual test grid;

or determining the grid blocks of the virtual test grid that fall in [X, Y] pixel area range, where both X and Y are positive integers; and extracting coordinates from one or more preset positions on each of the determined grid blocks to obtain the preset number of coordinate data.

3. The test method of claim 1, wherein the generating the corresponding test report for the tested application based on the test data comprises:

matching test data of each of the various controls with the area pixel data in the configuration file;

if there exists the test data that doesn't match the area pixel data in the configuration file, determining that the control corresponding to the test data is a test-abnormal control; and generating a corresponding test report for the determined test-abnormal controls, wherein the test report contains list information of these test-abnormal controls.

4. The test method of claim 2, wherein the generating the corresponding test report for the tested application based on the test data comprises:

matching test data of each of the various controls with the area pixel data in the configuration file;

if there exists the test data that doesn't match the area pixel data in the configuration file, determining that the control corresponding to the test data is a test-abnormal control; and generating a corresponding test report for the determined test-abnormal controls, wherein the test report contains list information of the test-abnormal controls.

5. The test method of claim 1, wherein the generating the corresponding test report for the tested application based on the obtained test data comprises:

matching test data of each of the various controls with the area pixel data in the configuration file;

if there exists the test data that doesn't match the area pixel data in the configuration file, determining that the control corresponding to the test data is a test-abnormal control; and generating a corresponding test report for the determined test-abnormal controls, wherein the test report contains list information of the test-abnormal controls.

6. The test method of claim 1, wherein the generating the corresponding test report for the tested application based on the test data comprises:

matching corresponding test data of each of the various controls with the area pixel data in the configuration file;

if there the test data that doesn't match the area pixel data in the configuration file, determining that the control corresponding to the test data is a test-abnormal control; and generating a corresponding test report for the determined test-abnormal controls, wherein the test report contains list information of these test-abnormal controls.

7. A test system comprising:

a setting module configured to set parameters of a test grid used for grid testing, to obtain corresponding setting parameters;

a grid generation module configured to simulate and thus generate a virtual test grid corresponding to the setting parameters for an uppermost layer surface of an operating interface of a tested application;

an extraction module configured to extract a preset number of coordinate data from within the virtual test grid according to a preset coordinate extraction rule;

an acquisition module configured to acquire a configuration file of the tested application from a terminal under test, and determine respective area pixel data of various controls of the tested application from the configuration file;

a test module configured to test the various controls based on the coordinate data and area pixel data according to a preset test rule, to obtain respective test data of the various controls, wherein the test module comprises:

a grouping unit configured to group extracted coordinate data by the area pixel data to which the extracted coordinate data belongs;

a sorting unit configured to sort test priorities of the various controls according to a preset sorting rule, to obtain the various controls that have been ordered according to the test priorities;

a testing unit configured to test the various sorted controls one by one according to a preset test rule, to obtain the test data of the various controls, wherein the testing unit is further configured to: send corresponding test prompt messages for the various controls to the terminal under test in a one-by-one manner according to the test priority order, and identify whether test data of corresponding control has been received from the terminal under test if identifying the test data of the corresponding control has been acquired from the terminal under test, continue to send the test prompt message for the control ordered after the corresponding control according to the test priority order; and otherwise if identifying no test data of the corresponding control has been acquired from the terminal under test, continue to acquire the test data of the corresponding control from the terminal under test; and a report generation module configured to generate a corresponding test report for the tested application based on the test data.

8. The test system of claim 7, wherein the extraction module comprises:
an extraction unit configured to extract coordinates from one or more preset positions on each of various grid blocks in the virtual test grid so as to obtain the preset number of coordinate data, where the preset number is an integral multiple of the number of grid blocks in the virtual test grid;
or the extraction module further comprises a determination unit configured to determine the grid blocks of the virtual test grid that fall in [X, Y] pixel area range, where both X and Y are positive integers; wherein the extraction unit is further configured to extract coordinates from one or more preset positions on each of the determined grid blocks, so as to extract the preset number of coordinate data.

9. The test system of claim 7, wherein the report generation module comprises:
a matching unit configured to match test data of each of the various controls with the area pixel data in the configuration file; and
a generating unit configured to:
if there exists the test data that doesn't match the area pixel data in the configuration file, determine that the control corresponding to the test data is a test-abnormal control; and
generate a corresponding test report for the determined test-abnormal controls, wherein the test report contains list information of the test-abnormal controls.

10. The test system of claim 8, wherein the report generation module comprises:
a matching unit configured to match test data of each of the various controls with the area pixel data in the configuration file; and
a generating unit configured to:
if there exists the test data that doesn't match the area pixel data in the configuration file, determine that the control corresponding to the test data is a test-abnormal control; and
generate a corresponding test report for the determined test-abnormal controls, wherein the test report contains list information of the test-abnormal controls.

11. The test system of claim 7, wherein the report generation module comprises:
a matching unit configured to match test data of each of the various controls with the area pixel data in the configuration file; and
a generating unit configured to:
if there exists the test data that doesn't match the area pixel data in the configuration file, determine that the control corresponding to the test data is a test-abnormal control; and
generate a corresponding test report for the determined test-abnormal controls, wherein the test report contains list information of the test-abnormal controls.

12. The test system of claim 7, wherein the report generation module comprises:
a matching unit configured to match the corresponding test data of each of the various controls with the area pixel data in the configuration file; and
a generating unit configured to:
if there exists the test data that doesn't match the area pixel data in the configuration file, determine that the control corresponding to the test data is a test-abnormal control; and
generate a corresponding test report for the determined test-abnormal controls, wherein the test report contains list information of the test-abnormal controls.

13. A test device, comprising a processing unit, as well as a test system, an input/output unit, a communication unit, and a storage unit that are coupled to the processing unit; wherein
the input/output unit is configured to input a user instruction and output response data of the test device to the input user instruction;
the communication unit is configured to communicatively connect with a predetermined terminal or a background server;
the storage unit is configured to store the test system as well as operating data of the test system;
the processing unit is configured to invoke and execute the test system to perform the following operations:
setting parameters of a test grid used for grid testing, to obtain corresponding setting parameters;
simulating and generating a virtual test grid corresponding to the setting parameters for an uppermost layer surface of an operating interface of a tested application;
extracting a preset number of coordinate data from within the virtual test grid according to a preset coordinate extraction rule;
acquiring a configuration file of the tested application from a terminal under test, and determining respective area pixel data of various controls of the tested application from the configuration file;
testing the various controls based on the coordinate data and area pixel data according to a preset test rule, to obtain respective test data of the various controls, wherein the testing the various controls comprises: grouping extracted coordinate data by the area pixel data to which the extracted coordinate data belongs; sorting test priorities of the various controls according to a preset sorting rule, to obtain the various controls that have been ordered according to the test priorities; and testing the various sorted controls one by one according to a preset test rule, to obtain the test data of the various controls, wherein the testing the various sorted controls comprises: sending corresponding test prompt messages for the various controls to the terminal under test in a one-by-one manner according to the test priority order, and identifying whether test data of corresponding control has been acquired from the terminal under test if identifying the test data of the corresponding control has been acquired from the terminal under test, continuing to send the test prompt message for the control ordered after the corresponding control according to the test priority order; and otherwise if identifying no test data of the corresponding control has been acquired from the terminal under test, continuing to acquire the test data of the corresponding control from the terminal under test; and
generating a corresponding test report for the tested application based on the test data.

14. The test device of claim 13, wherein the extracting the preset number of coordinate data from within the virtual test grid according to the preset coordinate extraction rule comprises:
extracting coordinates from one or more preset positions on each of various grid blocks in the virtual test grid, so as to obtain the preset number of coordinate data, where the preset number is an integral multiple of the number of grid blocks in the virtual test grid;

or determining the grid blocks of the virtual test grid that fall in [X, Y] pixel area range, where both X and Y are positive integers; and extracting coordinates from one or more preset positions on each of the determined grid blocks to obtain the preset number of coordinate data.

15. The test device of claim 13, wherein the generating the corresponding test report for the tested application based on the test data comprises:

matching test data of each of the various controls with the area pixel data in the configuration file;

if there exists the test data that doesn't match the area pixel data in the configuration file, determining that the control corresponding to the test data is a test-abnormal control; and generating a corresponding test report for the determined test-abnormal controls, wherein the test report contains list information of the test-abnormal controls.

* * * * *